(No Model.)

M. V. COUTINHO.
MACHINE FOR FUMIGATING MILK OF INDIA RUBBER TREES.

No. 531,781. Patented Jan. 1, 1895.

WITNESSES:
B. W. Chamberlin
Frank E. Cox

INVENTOR
Manoel Vianna Coutinho

BY
Stephen J. Cox
ATTORNEY

UNITED STATES PATENT OFFICE.

MANOEL VIANNA COUTINHO, OF PARA, BRAZIL.

MACHINE FOR FUMIGATING MILK OF INDIA-RUBBER TREES.

SPECIFICATION forming part of Letters Patent No. 531,781, dated January 1, 1895.

Application filed October 10, 1894. Serial No. 525,526. (No model.)

*To all whom it may concern:*

Be it known that I, MANOEL VIANNA COUTINHO, a citizen of Brazil, residing at the city of Para, Brazil, South America, have invented a new and useful Improvement in Machines for Fumigating the Milk of the India-Rubber Tree, (*Siphonia elastica*,) of which the following is a full and complete description, enabling others skilled in the art to which it pertains to make the same.

My invention relates to an apparatus for fumigating the sap of the india rubber tree. Its object is to provide a means for effecting the same in a simple and reliable manner by providing an apparatus which may be transported in sections to the location desired and set up and taken down by a mere tyro in mechanical devices.

It consists in the device and parts illustrated in the accompanying drawings in which like letters refer to like parts in each, and fully described in the following description.

Figure 1:
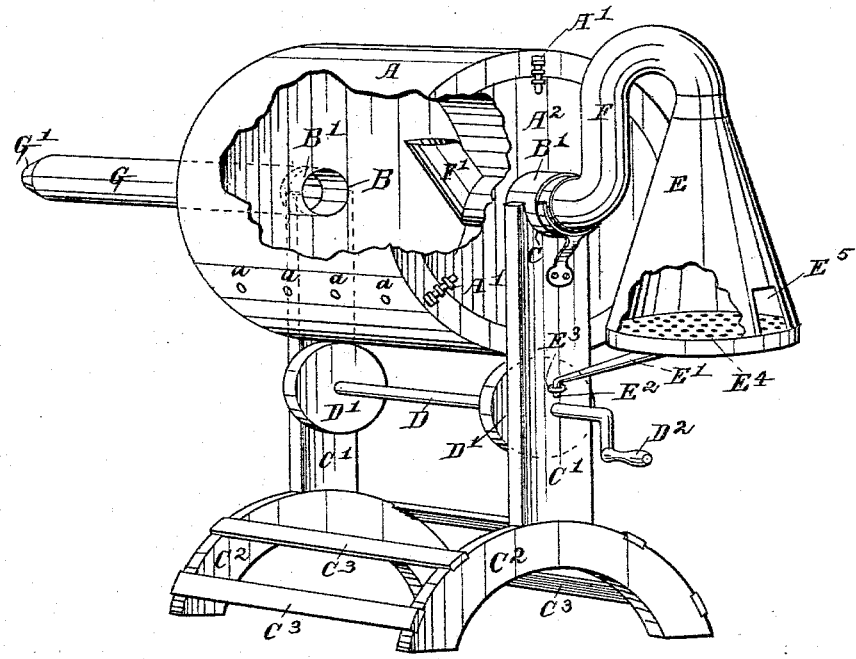
Figure 2:
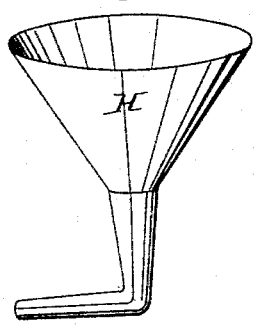
Figure 3:
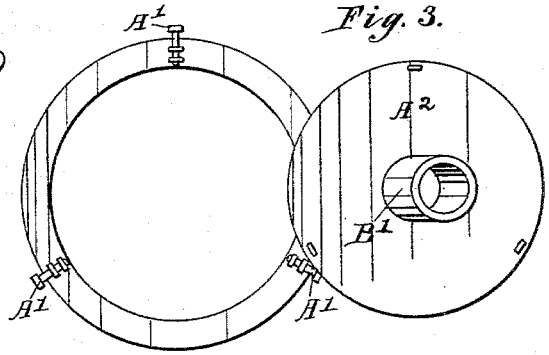

Figure 1 is a perspective view of apparatus partly torn away to show interior. Fig. 2 is the charging funnel. Fig. 3 shows the removable head end of the cylinder, with door removed.

In the drawings A is a closed cylindrical chamber, having a central perforation B on either end. This chamber is preferably made of iron. The head on one end is preferably soldered in position. In the other an opening is provided as a means of communication with the interior of the chamber. This opening is closed by a circular removable door $A^2$ held in position by a series of slide bolts $A'$. By sliding these bolts the whole door may be removed at pleasure. The perforations B are provided with collars $B'$ which act as hubs upon which the chamber A turns, and also as inlets and outlets for smoke and heated air and vapor.

The chamber A is mounted on trunnions C formed on the vertical posts $C'$. These posts have proper feet $C^2$ to rest upon the ground and may be braced as shown at $C^3$ in the drawings to more effectually secure them and maintain them in proper relation to each other. Through the posts $C'$ is a perforation to admit of the crank shaft D. Passing on this shaft as their axis are fixed the friction wheels $D'$. These wheels are preferably wooden disks. They are rotated by means of the crank $D^2$ and when they are so rotated, being in frictional contact with the perimeter of the chamber A, they cause that chamber to rotate.

The means of conveying heat to the interior of the chamber A is an inverted cone shaped fire pot E. This fire pot may be located upon the ground, but it is preferably lodged on a bracket $E'$, which has a pintle $E^2$ on one end lodged in an eye $E^3$. This arrangement admits of the fire pot being adjusted as it may be desired and also admits of its being taken down easily. The fire pot E has a perforated bottom $E^4$ and a charging hole closed by a door $E^5$. Instead of perforations bars may be used. Through the door $E^5$ the fuel used in the fumigation is inserted. This door may be used to regulate the draft required.

Adjustably fixed on the top of the fire pot E is a bent pipe F. This pipe passes loosely through the collar $B'$ and then within the chamber A is again bent upward at $F'$. The pipe F does not come in frictional contact with the collar, but admits of the collar rotating about it as an axis. Upon the opposite end of the chamber and fixed on the collar $B'$ on that end is the pipe G, which is the discharge port for the products of combustion and fumigation. This pipe is sleeved over the collar $B'$, and when the collar rotates, rotates with it. There is preferably a reduced portion $G'$ on the end of this discharge pipe to prevent the heat and products of combustion from escaping too freely from the chamber A.

A series of perforations $a, a, a$, closed by plugs or other means is made through the case of the chamber A. These perforations are used as discharge ports for water that may remain in the chamber after the milk has been fumigated.

The funnel H is used as a means of charging the chamber A. This charging is effected by removing the discharge pipe G, and placing the small end in and through the collar $B'$. The milk is then poured through the funnel until the surface is just below the collar. The discharge pipe is then replaced and a fire lighted in the fire pot. The heat and other products of combustion from this fire pass through the pipe F and into the chamber A, through the upward bend of the pipe $F'$. At the same time the crank is turned and the friction wheels cause the chamber A to slowly rotate. As the chamber rotates the milk clings to the inner surface of that portion of the chamber above the surface of the sap and a very large and thin surface is exposed to the action of the induced heat. This expels the lighter portions of the milk and leaves a pasty deposit which by the rotation of the chamber is compacted into a long cylindrical form. When the pasty residuum is of proper consistency the remaining fluid is permitted to escape through the perforations $a$, $a$, $a$ and the mass of rubber removed through the opening in the end of the cylinder.

Having thus described my invention, what I claim as new, and desire to secure by Letters Patent, is—

In a machine for fumigating the milk of the india rubber tree, the combination with a frame, a centrally perforated cylindrical chamber supported therein, and having a removable head; inlet pipe B' and discharge pipe G, located in the ends of said chamber; of a fire pot E having pipe F and an upturned end F' opening into the chamber; a bracket supporting said fire pot and friction wheels mounted in the frame and adapted to rotate the cylindrical chamber, substantially as and for the purpose set forth.

MANOEL VIANNA COUTINHO.

Witnesses:
FRANK E. COX,
RODRIGO MARQUES DOS SANTOS, Jov.